(12) United States Patent
Kim et al.

(10) Patent No.: US 8,913,539 B2
(45) Date of Patent: Dec. 16, 2014

(54) METHOD AND APPARATUS FOR UPDATING MULTICAST AND BROADCAST SERVICE SYSTEM INFORMATION IN A WIRELESS ACCESS SYSTEM

(75) Inventors: Jeongki Kim, Anyang-si (KR); Kiseon Ryu, Anyang-si (KR); Youngsoo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 116 days.

(21) Appl. No.: 13/640,982

(22) PCT Filed: Apr. 14, 2011

(86) PCT No.: PCT/KR2011/002678
§ 371 (c)(1),
(2), (4) Date: Oct. 12, 2012

(87) PCT Pub. No.: WO2011/129639
PCT Pub. Date: Oct. 20, 2011

(65) Prior Publication Data
US 2013/0028165 A1  Jan. 31, 2013

Related U.S. Application Data

(60) Provisional application No. 61/324,277, filed on Apr. 14, 2010, provisional application No. 61/359,369, filed on Jun. 29, 2010.

(30) Foreign Application Priority Data

Apr. 14, 2011  (KR) .................. 10-2011-0034535

(51) Int. Cl.
*H04H 20/71* (2008.01)
*H04W 72/00* (2009.01)

(52) U.S. Cl.
CPC .................................. *H04W 72/005* (2013.01)
USPC ......................................................... 370/312

(58) Field of Classification Search
USPC .......................... 370/312, 328–339, 350, 390
See application file for complete search history.

(56) References Cited

U.S. PATENT DOCUMENTS 8,644,251 B2 * 2/2014 Ji .................................. 370/331
8,670,397 B2 * 3/2014 Josiam et al. ................. 370/329
(Continued)

FOREIGN PATENT DOCUMENTS

KR  10-2009-0037702 A  4/2009
KR  10-2009-0048761 A  5/2009
(Continued)

OTHER PUBLICATIONS

Josiam et al, E-MBS Drafting Group: Harmonized Text Proposal with Comments, IEEE, 12 pages, Sep. 18, 2009.*

*Primary Examiner* — Frank Duong
(74) *Attorney, Agent, or Firm* — Birch, Stewart, Kolasch & Birch, LLP

(57) ABSTRACT

The present description relates to a method for updating E-MBS-related system information in an idle mode state, comprising the following steps: receiving, from a base station, a first system configuration descriptor (SCD) message containing an E-MBS-related parameter; receiving, from the base station, a first message containing an indicator for indicating whether or not to change the E-MBS-related parameter; and, if the indicator indicates that the E-MBS-related parameter is to be changed, shifting from the idle mode state to a connected mode state.

8 Claims, 8 Drawing Sheets

(56) References Cited

U.S. PATENT DOCUMENTS

2010/0002631 A1    1/2010   Cho et al.
2010/0202340 A1*   8/2010   Josiam et al. ............... 370/312
2011/0110346 A1*   5/2011   Kim et al. .................... 370/338

FOREIGN PATENT DOCUMENTS

KR   10-2010-0004846 A    1/2010
WO   WO 2005/079105 A1    8/2005

* cited by examiner

METHOD AND APPARATUS FOR UPDATING MULTICAST AND BROADCAST SERVICE SYSTEM INFORMATION IN A WIRELESS ACCESS SYSTEM

This application is the National Phase of PCT/KR2011/002678 filed on Apr. 14, 2011, which claims priority under 35 U.S.C. 119(e) to U.S. Provisional Application No. 61/324,277 filed on Apr. 14, 2010 and U.S. Provisional Application No. 61/359,369 filed on Jun. 29, 2010, and under 35 U.S.C. 119(a) to Patent Application No. 10-2011-0034535 filed in the Republic of Korea on Apr. 14, 2011 all of which are hereby expressly incorporated by reference into the present application.

BACKGROUND OF THE INVENTION

1. Field of the Invention

This disclosure relates to a wireless access system, and particularly to a method and apparatus for updating E-MBS system information.

2. Related Art

FIG. 1 illustrates an example of a frame structure.

Referring to FIG. 1, a superframe (SF) includes a superframe header (SFH) and four frames F0, F1, F2, and F3. The frames of the superframe may have the same length. Although the size of each superframe is 20 ms and the size of each frame is 5 ms, the present invention is not limited thereto. The length of the superframe, the number of frames included in the superframe, and the number of subframes included in a frame may be variously changed. The number of subframes included in a frame may be variously changed depending on the channel bandwidth and a cyclic prefix (CP).

One frame includes a plurality of subframes SF0, SF1, SF2, SF3, SF4, SF5, SF6, and SF7. Each subframe may be used for uplink or downlink transmission. One subframe includes a plurality of orthogonal frequency division multiplexing (OFDM) symbols or orthogonal frequency division multiple access (OFDMA) in the time domain and a plurality of subcarriers in the frequency domain.

The OFDM symbol is to represent one symbol period and may be referred to by other terms, such as OFDMA symbol or SC-FDMA symbol, according to the type of multiple access scheme.

The subframe may consist of 5, 6, 7, or 9 OFDMA symbols, but this is merely an example, and the number of OFDMA symbols included in the subframe is not limited. The number of OFDMA symbols included in the subframe may be variously changed depending on the channel bandwidth or the length of CP.

Depending on the number of OFDMA symbols included in the subframe, the type of subframe may be defined. For example, type-1 subframe may be defined to include 6 OFDMA symbols, type-2 subframe to include 7 OFDMA symbols, type-3 subframe to include 5 OFDMA symbols, and type-4 subframe to include 9 OFDMA symbols. One frame may include subframes having the same type. Or, one frame may include subframes having different types. That is, the number of OFDMA symbols included in each subframe of one frame may be the same or different. Or, the number of OFDMA symbols of at least one subframe in one frame may be different from the number of OFDMA symbols of the remaining subframes in the frame.

A time division duplex (TDD) scheme or a frequency division duplex (FDD) scheme may apply to the frame. In the TDD scheme, each subframe is used for uplink transmission or downlink transmission at different times at the same frequency.

That is, in the TDD scheme, the subframes in the frame are separated into uplink subframes and downlink subframes in the time domain. In the FDD scheme, each subframe is used for uplink transmission or downlink transmission at different frequencies at the same time. That is, in the FDD scheme, the subframes in the frame are separated into uplink subframes and downlink subframes in the frequency domain. The uplink transmission and the downlink transmission take up different frequency bandwidths and may be performed at the same time.

SFH may transport essential system parameters and system configuration information. SFH may be positioned in the first subframe of the superframe. SFH may occupy the last five OFDMA symbols in the first subframe.

The superframe header may be classified into primary SFH (P-SFH) and secondary SFH (S-SFH). P-SFH and S-SFH may be transmitted per superframe. S-SFH may be transmitted in two consecutive superframes. Information transmitted through S-SFH may be divided into three sub-packets S-SFH SP1, S-SFH SP2, and S-SFH SP3. Each sub-packet may be periodically transmitted at different periods. Pieces of information transmitted through S-SFH SP1, S-SFH SP2, and S-SFH SP3, respectively, may have different degrees of importance, and S-SFH SP1 may be transmitted at the shortest period, and S-SFH SP3 may be transmitted at the longest period.

S-SFH SP1 includes information on network re-entry.

S-SFH SP2 includes information on initial network entry and information on network discovery. S-SFH SP3 includes the remaining critical system information.

One OFDMA symbol includes a plurality of subcarriers, and the number of subcarriers is determined depending on the FFT size. There are several types of subcarriers. The types of subcarriers may be classified into data subcarriers for data transmission, pilot subcarriers for various ways of estimation, and null carriers for guard bands and DC carriers.

16m E-MBS(Enhanced Multicast and Broadcast Service)

The enhanced multicast and broadcast service (E-MBS) provides a user group of using common multicast station identifier (MSTID) and a flow identifier (FID) with an efficient method for simultaneous transmission of common downlink data. E-MBS is provided only for downlink, and may be coordinated or synchronized between base stations that belong to one group to permit macro diversity.

Each E-MBS connection is associated with the service flow provided together with the traffic parameters and quality of service (QoS) for the service flow. Service flows transmitting E-MBS data may be described as an example for individual terminals participating in the service while the terminals perform common operation. Through such description, the terminal identifies the service and learns the parameters associated with the service flow.

Each base station that may provide an E-MBS service belongs to a specific E-MBS zone, and one base station may belong to a plurality of E-MBS zones. The E-MBS zone is defined as one set of base stations which use the same MSTID and FID to transmit content of a specific service flow. Each E-MBS zone is distinguished from others by a unique E-MBS zone ID.

To assure the proper multicast operation over a network in which a base station supporting the E-MBS service is positioned, the MSTIDs and FIDs used for common E-MBS content and service should be the same for all the base stations in the same E-MBS zone.

This permits a terminal registered for a specific service to receive seamless E-MBS transmission in the E-MBS zone even without performing re-registration with another base station in the E-MBS zone or without performing uplink communication.

SUMMARY OF THE INVENTION

The SCD message includes system information related to the E-MBS. Here, when the E-MBS related system information is changed, the terminal should receive the changed E-MBS related system information from the base station to be able to properly receive the E-MBS.

The terminals which receive the E-MBS in the idle mode are awakened at the MSI start and receive E-MBS burst to which they subscribed and E-MBS MAP. The idle mode terminal receiving the E-MBS may not be awakened at each SCD transmission period to reduce power consumption.

Accordingly, if the corresponding terminal fails to receive the changed SCD message whose E-MBS related parameter has been changed, the terminal may not receive the E-MBS MAP.

FIG. 2 illustrates a situation where an idle mode terminal fails to receive the changed
E-MBS related parameter from a base station and thus cannot receive the E-MBS MAP.

As shown in FIG. 2, the terminal may not receive any of the E-MBS MAPs transmitted from the base station until the next SCD message is transmitted.

Referring to FIG. 2, in case although the E-MBS related parameter has been changed in the second SCD message, and the idle mode terminal fails to receive the corresponding SCD message, it cannot receive the service related to the fourth and fifth E-MBS MAPs. As a result, the terminal is forced to remain awakened until it receives the next SCD message. That is, the terminal may receive the third SCD message from the base station and may read the E-MBS MAP which is transmitted after the third SCD message is received.

Accordingly, this disclosure aims to provide a method of idle mode terminals updating E-MBS related parameters using information on the transmission time of the changed E-MBS related parameter and whether the E-MBS related parameter included in the SCD message is changed.

Further, an object of this disclosure is to provide a method of a base station transmitting E-MBS region information on a neighboring E-MBS zone to a terminal through an E-MBS configuration message (AAI_E-MBS-CFG message).

Still further, an object of this disclosure is to provide a method of a base station updating an E-MBS ID and FID mapping list for a neighboring E-MBS zone by informing a terminal that the base station is positioned at an E-MBS zone boundary.

In an aspect in this disclosure, a method of updating enhanced multicast and broadcast service (E-MBS) related system information in an idle mode includes receiving a first system configuration descriptor (SCD) message including an E-MBS related parameter from a base station, receiving a first message including an indicator indicating whether the E-MBS related parameter is changed from the base station, and performing a wake-up operation in the idle mode when the indicator indicates that the E-MBS related parameter is changed.

The method may further include receiving a second SCD message including the changed E-MBS related parameter from the base station, and updating the E-MBS related parameter based on the received second SCD message.

The indicator may indicate whether an E-MBS related parameter included in an SCD message first transmitted after the first message is transmitted is changed.

The first message may be an E-MBS MAP.

The indicator may be an SCD update indicator.

The E-MBS related parameter may indicate at least one of information corresponding to allocation of an E-MBS zone to which the base station belongs, information indicating the length of an E-MBS scheduling interval, and information indicating a position of a frame where an E-MBS data burst ends.

The first message may further include an SCD transmission time offset field indicating a time that a second SCD message including the changed E-MBS related parameter is transmitted.

The size of the SCD transmission time offset field may be determined according to a value of an E-MBS scheduling interval (EMI).

In another aspect in this disclosure, a terminal for updating enhanced multicast and broadcast service (E-MBS) related system information in an idle mode includes a radio frequency unit for transmitting and receiving a radio signal to/from an outside, and a controller connected to the radio frequency unit, wherein the controller controls the radio frequency unit configured to receive a first system configuration descriptor (SCD) message including an E-MBS related parameter from a base station, controls the radio frequency unit configured to receive a first message including an indicator indicating whether the E-MBS related parameter is changed from the base station, and when the indicator indicates that the E-MBS related parameter is changed, controls the idle mode to be shifted to a connection mode.

The controller may control the radio frequency unit configured to receive a second SCD message including the changed E-MBS related parameter from the base station, and may control the E-MBS related parameter to be updated based on the received second SCD message.

The indicator may indicate whether an E-MBS related parameter included in a SCD message first transmitted after the first message is transmitted.

The E-MBS related parameter may indicate at least one of information corresponding to allocation of an E-MBS zone to which the base station belongs, information indicating the length of an E-MBS scheduling interval, and information indicating a position of a frame where an E-MBS data burst ends.

The first message may further include an SCD transmission time offset field indicating a time that a second SCD message including the changed E-MBS related parameter is transmitted The size of the SCD transmission time offset field may be determined according to a value of an E-MBS scheduling interval (EMI).

In another aspect in this disclosure, a method of updating enhanced multicast and broadcast service (E-MBS) related system information in a wireless access system includes receiving a first message including E-MBS region information corresponding to at least one neighboring E-MBS zone from a base station, wherein the E-MBS region information is included in the first message per base station belonging to the at least one neighboring E-MBS zone and is transmitted.

The first message may further include an indicator indicating whether the E-MBS region information of the base station belonging to the at least one neighboring E-MBS zone is included.

The first message may further include index information of a neighboring base station belonging to the at least one neighboring E-MBS zone, wherein the E-MBS region information is included in the first message when the index information of the neighboring base station is first included in the first message.

The first message may be an E-MBS configuration message (AAI_E-MBS-CFG message).

In this disclosure, the base station includes the SCD update indicator and changed SCD transmission time information in the E-MBS MAP and transmits it to the terminal, so that the idle mode terminal may receive the E-MBS even without waking up at each SCD period.

DESCRIPTION OF EXEMPLARY EMBODIMENTS

Figure 1:
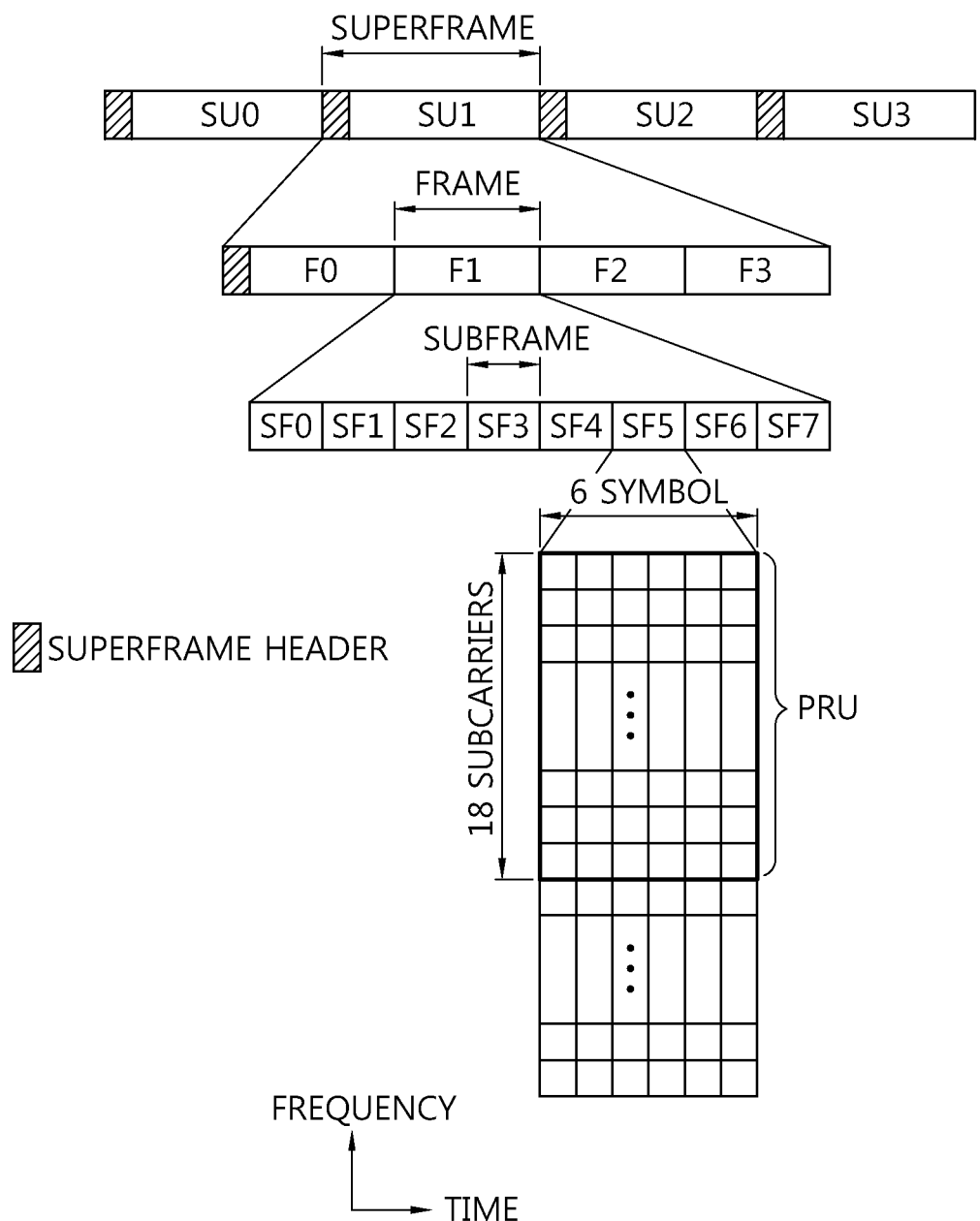
FIG. 1 illustrates an example of a frame structure.
Figure 2:
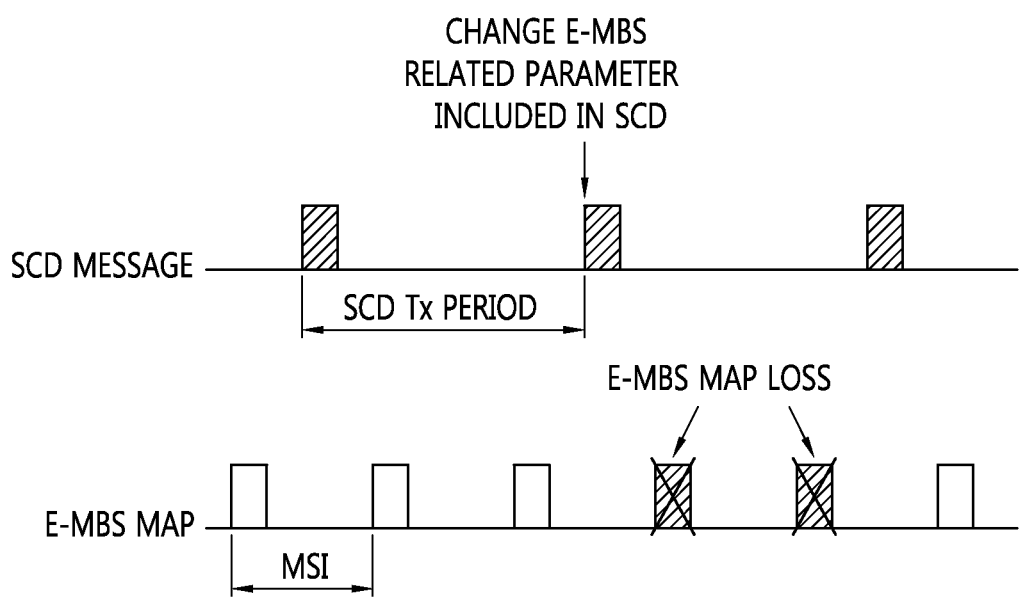
FIG. 2 illustrates a situation where an idle mode terminal fails to receive the changed E-MBS related parameter from a base station and thus cannot receive the E-MBS MAP.

As suggested herein, the technologies may be used in various wireless communication systems, such as code division multiple access (CDMA), frequency division multiple access (FDMA), time division multiple access (FDMA), orthogonal frequency division multiple access (OFDMA), or single carrier frequency division multiple access SC-FDMA). CDMA may be implemented in the radio technologies, such as universal terrestrial radio access (UTRA) or CDMA2000. TDMA may be implemented in the radio technologies, such as global system for mobile communications (GSM)/general packet radio service (GPRS)/enhanced data rates for GSM evolution (EDGE). OFDMA may be implemented in the radio technologies, such as institute of electrical and electronics engineers (IEEE) 802.11(Wi-Fi), IEEE 802.16(WiMAX), IEEE 802-20, or evolved UTRA (E-UTRA). IEEE 802.16m is an advanced version of IEEE 802.16e and provides backward compatibility with the systems based on IEEE 802.16e.

UTRA is part of universal mobile telecommunications system (UMTS).

3rd generation partnership project (3GPP) long term evolution (LTE) is part of evolved UMTS (E-UMTS) that uses E-UTRA, and adopts OFDMA for downlink and SC-FDMA for uplink. LTE-advanced (LTE-A) is an advanced version of 3GPP LTE.

For clarity of description, the description primarily focuses on IEEE 802.16m. However, the technical spirit of the present invention is not limited thereto.

Hereinafter, what is associated with E-MBS operation is described.

E-MBS Transmission Mode

There are two E-MBS traffic transmission modes, such as non-macro diversity transmission mode and macro diversity transmission mode.

1. Non-macro Diversity Mode

In the non-macro diversity mode, the base stations in the same zone coordinate transmission in the same frame, and this is used when the macro diversity mode is not used. All the base stations belonging to the same E-MBS zone transmit service data unit (SDU) that transports the same content in the same frame. Such SDU is mapped with media access protocol (MAC) protocol data units (MPDUs) in the same frame. This means the same SDU fragments, the same fragment sequence number, and the same fragment size. This enables the same AMSs to receive E-MBS transmission from ABSs in the same zone.

2. Macro Diversity Mode

Macro diversity mode means that all the ABSs in one zone synchronize E-MBS transmission, and this means that all the ABSs in one zone transmit the same data at the same time by using the same resource. This enables a macro diversity gain to be obtained in the E-MBS transmission. Specifically, all the ABSs in the same zone share the following information:
1) E-MBS Zone ID, MSTID & FID, MSI, and packet classification rule parameter(s)
2) Transmission physical (PHY) parameters, modulation and coding scheme (MCS) associated with each E-MBS burst including forward error correction (FEC) type, modulation type, and repetition coding
3) Mapping of SDUs to PDU (order of the SDUs and fragments) including extended headers
4) Mapping of PDUs to bursts
5) Order of bursts in the zone/region
6) E-MBS MAP construction Features and Functions of E-MBS Protocol 1. E-Mbs Configuration Indicator Information on the E-MBS configuration is periodically transmitted to the terminals that are interested in E-MBS using an MAC control message that is called "AAI_E-MBS-CFG message".

The E-MBS configuration indicator specifies resources secured for additional information necessary for E-MBS traffic and E-MBS operation in the downlink physical resource.

2. E-MBS Zone Configuration

Other E-MBS IDs and FIDs may be used in other E-MBS zones for the same E-MBS service flow. The E-MB-S_ZONE_ID is used to indicate service areas where the E-MBS ID and FID for the E-MBS service flow are valid. In case of the base station supporting the E-MBS, the ID of the E-MBS zone to which the base station belongs is included in the E-MBS CFG message. The E-MBS zone ID may not be '0'.

When the base station transmits the AAI_DSA message to establish a connection for the E-MBS zone ID, the E-MBS zone ID is encoded in the DSA message. One base station may have a plurality of E-MBS zone IDs for other E-MBSs.

3. E-MBS Scheduling Interval (MSI)

One MSI is provided for each E-MBS zone. Here, MSI refers to the number of consecutive superframes where an access network may schedule traffic for streams associated with the E-MBS zone before the MSI starts.

MSI may have an interval between several superframes and the length of the MSI that is indicated $N_{MSI}$, and this depends upon special use of the E-MBS. $N_{MSI}$=4, 8, 16, and 32 superframe length. The E-MBS MAP message has a mapping address of the E-MBS data associated with the E-MBS zone during one whole MSI. The E-MBS MAP message is configured to sufficiently define one transmission circumstance for a given stream in one MSI. The indication of the MSI length is transmitted through the SCD message. By using the superframe number, $N_{superframe}$ from SFH and $N_{MSI}$ from the SCD message, the terminal calculates the start of MSI as follows:

MSI starts at the superframe in which $N_{superframe}$ of MSI satisfies the following condition.

$N_{Nsuperframe}$ Modulo $N_{MSI}$=0

The terminal may demodulate E-MBS data bursts associated with only the content selected by a user. The terminal wakes up at each MSI to identify whether there is E-MBS data burst to be demodulated.

AAI_SCD (System Configuration Descriptor) Message

The AAI_SCD message is transmitted from the base station at a periodic interval to define a system configuration.

The SCD message includes E-MBS related parameters. Here, the E-MBS related parameters include a parameter associated with E-MBS zone allocation (Zone Allocation Bit-MAP, ZF), an MSI Length (NMSI) parameter that indicates the MSI length whose unit is the number of superframes, and an E-MBS AAT frame offset parameter that indicate the position of the AAI frame where the E-MBS data burst ends.

The following Table 1 shows an example of an SCD message format that includes the E-MBS related parameters.

TABLE 1

| M/O | Attributes/Array of attributes | Size (bits) | Value/Note | Conditions |
|---|---|---|---|---|
| ... | ... | ... | ... | ... |
| O | E-MBS Configuration Parameters  Zone_Allocation-Bit-MAP | $DSAC_{MAX} - 1$ | | Present when E-MBS is configured |
| | ZF | 1 | Zone Flag bit. Indicates the use of the last zone. 0b0: Unicast 0b1: E-MBS | |
| | MSI Length ($N_{MSI}$) | 2 | The length of an MSI in units of the number of superframes 0b00: 2 superframes, 40 ms ($N_{MSI} = 2$) 0b01: 4 superframes, 80 ms ($N_{MSI} = 4$) 0b10: 8 superframes, 160 ms ($N_{MSI} = 8$) 0b11: 16 superframes, 320 ms ($N_{MSI} = 16$) | |
| | E-MBS AAI frame offset | variable | The location of the AAI frame where the E-MBS data burst ends MSI length == 0b00: 3 bits MSI length == 0b01: 4 bits MSI length == 0b10: 5 bits MSI length == 0b11: 6 bits | |

Referring to Table 1, Zone Allocation Bit-MAP consists of subband indices reserved for all the E-MBS zones to which the base station belongs. Zone Allocation Bit-MAP included in the SCD message discerns use of the resource constituting a set of consecutive subbands in one downlink AM subframe. Zone Allocation Bit-MAP determines the size of each E-MBS zone, index of each E-MBS zone where the allocated E-MBS zone starts, and the number of all the allocated zones by the number of consecutive subband logical resource units (SLRU)s in the subframe in the frequency domain.

AAI_E-MBS-CFG Message

The E-MBS configuration message is transmitted in the superframe where $N_{superframe}$ transmitted from SFH satisfies the following condition:

$N_{superframe}$ modulo 32=31

The following Table 2 shows an example of E-MBS configuration message (AAI_E-MBS-CFG message) format.

TABLE 2

AAI-E-MBS-CFG Message Field Description

| Field | Size (bits) | Value/Description | Condition |
|---|---|---|---|
| E-MBS_CFG_LIFETIME (m) | 4 | A value that indicates when the AMS shall decode the next instance of E-MBS configuration message. It is the duration during which the contents of the AAI-E-MBS-CFG message of the zone do not change. The next E-MBS configuration message that the AMS shall decode, is at the superframe whose superframe number, $N_{superframe}$, satisfies the following condition. $N_{superframe}$ modulo $32(m + 1) == 32(m \cdot 1) - 1$ At the end of the lifetime, the ABS resets the E-MBS_CFG_LIFETIME to a value between 1111 and 0000. | |
| For (i=0; i<Num E-MBS Zone; i++) { | | Num E-MBS Zone is the number of E-MBS Zones included in this message. Range: 1~8 | |
| E-MBS_Zone_ID | 7 | The E-MBS_Zone_ID to which this E-MBS MAP applies. | |
| E-MBS MAP Resource Index | 11 | Resource index includes location and allocation size. | |
| E-MBS MAP $I_{SizeOffset}$ | 5 | Offset used to compute burst size of E-MBS MAP | |
| AAI-NBR-ADV Change Count | 3 | Indicates the value of AAI-NBR-ADV change count | |
| For (j=0: j<Num Neighbor E-MBS Zones: j+−) { | | Num Neighor E-MBS Zones is the number of neighbor E-MBS Zone of an E-MBS Zone. Range: 0~7 | Present when the S-ABS is located at the zone boundary and inter-zone service continuity is supported. |

TABLE 2-continued

AAI-E-MBS-CFG Message Field Description

| Field | Size (bits) | Value/Description | Condition |
|---|---|---|---|
| Neighbor E-MBS Zone ID | 7 | Neighbor E-MBS Zone ID | |
| Physical Carrier Index | 6 | Target Carrier which the AMS switches or is redirected by ABS to | Present only if the current neighbor E-MBS Zone is served on a different carrier from the previous one at the neighbor E-MBS zone |
| For (k-0; k<Num__Neighbor__ABS; k++) { | | Num__Neighbor__ABS is the number of neighbor ABSs which belong to the current neighbor E-MBS Zone. Range: 1~256 | |
| ABS Index | 8 | Index of Neighbor ABS | |
| } | | | |
| For (m-0; m<N E-MBS FID Mapping; m · 1) { | | N E-MBS FID Mapping is the number of mappings of current E-MBS ID and FID and new E-MBS ID and FID between serving E-MBS Zone and neighbor E-MBS Zone. Range: 0~15 | Present when the list of E-MBS ID and FID supported by serving E-MBS Zone is not same as one supported by neighbor E-MBS Zone. |
| Current E-MBS ID and FID and New__E-MBS_ID and FID | 32 | Mapping of current E-MBS ID and FID and new E-MBS ID and FID between serving E-MBS Zone and neighbor E-MBS Zone. 16 MSBs is the current E-MBS ID and FID, and 16 LSBs is the new E-MBS ID and FID. | |
| } | | | |
| } | | | |
| } | | | |

Hereinafter, a method of updating E-MBS related parameters of an idle mode terminal, a method of transmitting E-MBS zone information on a neighboring E-MBS zone, and a method of updating the E-MBS ID and FID mapping list for the neighboring E-MBS zone through an E-MBS zone boundary indication are described through embodiments suggested herein.

First Embodiment

The first embodiment provides a method in which whether E-MBS parameters included in a SCD message are changed and time that the changed E-MBS parameter is transmitted are notified to an idle mode terminal that receives an E-MBS, so that the idle mode terminal may properly receive the E-MBS.

Figure 3:
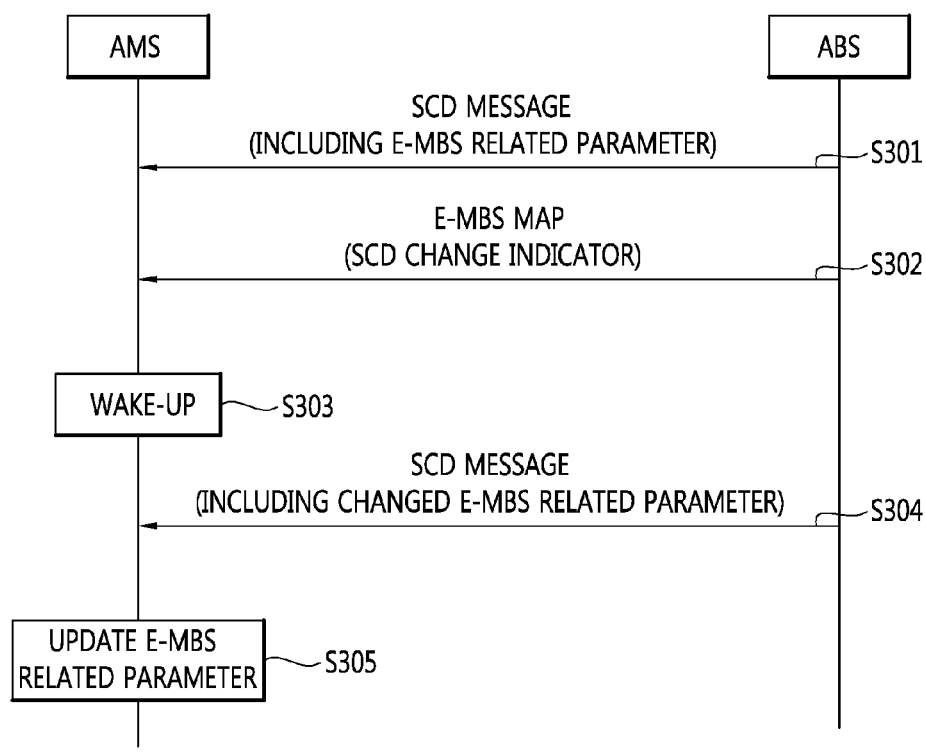
FIG. 3 is a flowchart illustrating a method of an idle mode terminal updating E-MBS related parameters according to the first embodiment.

FIG. 3 is a flowchart illustrating a method of an idle mode terminal updating E-MBS related parameters according to the first embodiment.

First, the terminal receives the SCD message including the E-MBS related parameters from the base station (S301). Here, the E-MBS related parameters may include a parameter related to E-MBS zone allocation (Zone Allocation Bit-MAP, ZF), an MSI Length (NMSI) parameter indicating the MSI length that is represented in unit of the number of superframes, and an E-MBS AAI frame offset parameter indicating the position of the AAI frame where the E-MBS data burst ends, as described above.

Next, the terminal receives from the base station a first message including an indicator that indicates whether the E-MBS related parameter is changed (S302).

Here, the indicator represents SCD update (or change) indicator.

Further, the first message includes E-MBS MAP, MAC control message, and header.

Hereinafter, as an example, the first message is the E-MBS MAP, but is not limited thereto.

Then, in case the indicator indicates that the E-MBS related parameter is changed (for example, when the indicator is set as '1'), the terminal shifts from the idle mode state to the connection mode state (S303).

Here, according to whether the first message includes information on the time of transmission of the SCD message including the changed E-MBS related parameter, after receiving the first message, the terminal immediately wakes up or when the SCD message is transmitted from the base station, the terminal wakes up to be able to the SCD message including the changed E-MBS related parameter. The information on the time of transmission of the SCD message will be described below in detail.

Next, the terminal receives from the base station a SCD message including the changed E-MBS related parameter (S304).

Then, the terminal updates the E-MBS related parameters based on the received SCD message (that is, based on the changed E-MBS related parameter) (S305).

1. Method of updating the E-MBS related parameter included in SCD message

The base station includes an indicator indicating whether the E-MBS related parameter included in the SCD message transmitted after the E-MBS MAP is changed in the E-MBS MAP and transmits it. That is, the base station transmits the indicator indicating whether the E-MBS related parameter is changed to thereby allow the idle mode terminal to be able to receive the changed E-MBS related parameter at a proper time.

Here, the E-MBS related parameter means Zone Allocation Bit-MAP, MSI Length, or E-MBS AAI frame offset field.

As an example, in case the SCD update indicator is set as '0', this indicates that the E-MBS related parameter included in the SCD message transmitted after the E-MBS MAP is not changed. In such case, the idle mode terminal need not be awakened so as to receive the SCD message.

Further, in case the SCD update indicator is set as '1', this indicates that the E-MBS related parameter included in the SCD message transmitted after the E-MBS MAP is changed. In such case, the idle mode terminal wakes up from the idle mode to receive the SCD message transmitted after the E-MBS MAP. Here, "the idle mode terminal wakes up to receive the SCD message" does not mean that it shifts from the idle mode to the connection mode.

That is, it merely means that the terminal monitors the downlink channel to receive the SCD message, and this does not mean that network reentry procedure to shift to the connection mode is performed. This situation means that the unavailable interval of the idle mode does not apply.

The following Table 3 shows an example of the E-MBS MAP format including the SCD update (or change) indicator according to the first embodiment.

TABLE 3

| Syntax | Size in bits | Notes |
| --- | --- | --- |
| E-MBS MAP ( ) { | | |
| ... | ... | ... |
| SCD update (or change) indicator | 1 | 0b0: E-MBS related parameter of SCD message transmitted right after the corresponding E-MBS MAP is not changed.<br>0b1: E-MBS related parameter of SCD message transmitted right after the corresponding E-MBS MAP is not changed. |
| E-MBS_DATA_IE( ) | Variable | |
| } | | |
| Padding | | |

Figure 4:
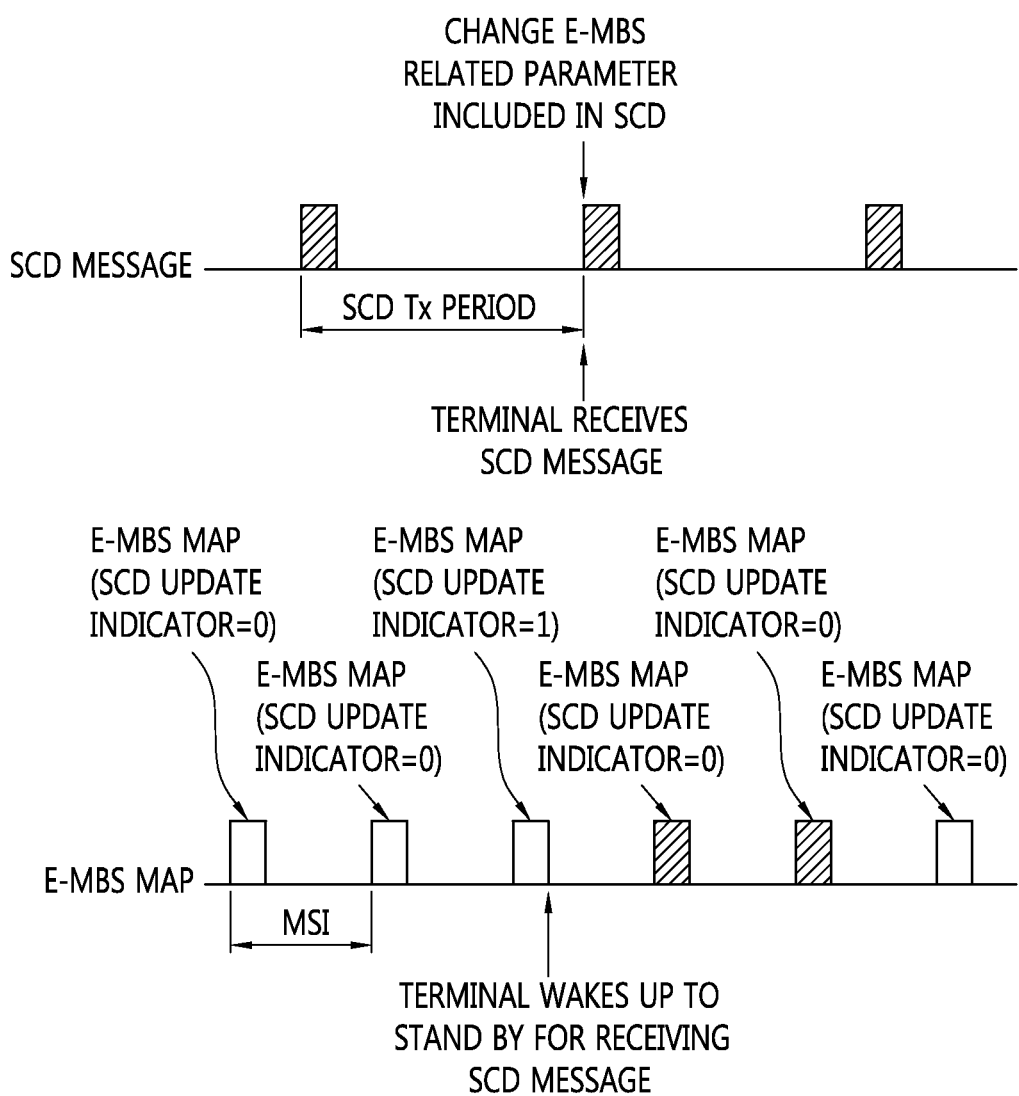
FIG. 4 is a view illustrating a method of an idle mode terminal updating an E-MBS related parameter by transmitting an E-MBS MAP including an SCD update indicator according to the first embodiment.

FIG. 4 is a view illustrating a method of an idle mode terminal updating an E-MBS related parameter by transmitting an E-MBS MAP including an SCD update indicator according to the first embodiment.

Referring to FIG. 4, the base station transmits the E-MBS MAP that includes an SCD update indicator indicating whether the E-MBS related parameter of the SCD message transmitted after the E-MBS MAP is changed.

Here, after the base station transmits the E-MBS MAP to the terminal, in case the E-MBS related parameter of the SCD message transmitted right after the E-MBS MAP is changed, the base station sets the SCD update indicator as, e.g., '1'.

When receiving the E-MBS MAP whose SCD update indicator is set as '1', the terminal determines that the SCD message transmitted after the E-MBS MAP includes the changed E-MBS related parameter.

Accordingly, when receiving the E-MBS MAP whose SCD update indicator is set as '1', the idle mode terminal wakes up to receive the SCD message including the changed E-MBS related parameter. Here, in case the terminal is aware of the time of transmission of the SCD message including the changed E-MBS related parameter, the terminal may wake up at the time that the SCD message is transmitted from the base station.

Next, the terminal receives the SCD message including the changed E-MBS related parameter from the base station, and updates the changed E-MBS related parameter information.

Further, in case of setting the SCD update indicator as '1', the base station may transmit the E-MBS MAP including the changed E-MBS related parameter.

Here, if the terminal fails to receive the E-MBS MAP including the changed E-MBS related parameter, the terminal should remain awakened to receive the SCD message to be transmitted next.

That is, if the terminal fails to receive the E-MBS MAP so remains awakened to receive the SCD message, and receives one or more E-MBS MAPs before receiving the SCD message, then the terminal need not receive the SCD message that is to be transmitted next.

Accordingly, the terminal immediately operates in the idle mode or does not perform the process of receiving the SCD message to be transmitted next.

The following Table 4 shows another example of the E-MBS MAP format including the changed E-MBS related parameter according to an embodiment of this disclosure.

TABLE 4

| Syntax | Size in bits | Description/Notes |
| --- | --- | --- |
| E-MBS-MAP ( ) { | — | — |
| ... | ... | ... |
| SCD change indicator | 1 | Indicates whether the E-MBS related parameters in next SCD message is changed.<br>If this field is set to 1, the changed E-MBS parameters of the next SCD message and adjust start time are included in this E-MBS MAP. |
| If (SCD update indicator ==1) { | | |
| Zone_Allocation-Bit-MAP | $DSAC_{MAX} - 1$ | |
| ZF | 1 | Zone Flag bit. Indicates the use of the last zone.<br>0b0: Unicast<br>0b1: E-MBS |
| MSI Length ($N_{MSI}$) | 2 | The length of an MSI in units of the number of superframes<br>0b00: 2 superframes, 40 ms ($N_{MSI} = 2$)<br>0b01: 4 superframes, 80 ms ($N_{MSI} = 4$)<br>0b10: 8 superframes, 160 ms ($N_{MSI} = 8$)<br>0b11: 16 superframes, 320 ms ($N_{MSI} = 16$) |
| E-MBS AAI frame offset | variable | The location of the AAI frame where the E-MBS data burst ends<br>MSI length == 0b00: 3 bits<br>MSI length == 0b01: 4 bits<br>MSI length == 0b10: 5 bits<br>MSI length == 0b11: 6 bits |

TABLE 4-continued

| Syntax | Size in bits | Description/Notes |
| --- | --- | --- |
| Adjustment start time | Variable | Indicates the start Lime (Units: either the number of superframe or the number of MSI) at which the E-MBS parameters are adjusted. |
| } | | |
| ... | ... | ... |
| } | | |
| Padding | variable | Padding to reach byte boundary |

As shown in Table 4, in case the E-MBS related parameter included in the SCD message is changed, the base station includes the changed E-MBS parameters (Zone Allocation Bit-MAP, ZF, MSI Length, E-MBS AAI frame offset) and information on the time that the corresponding parameters are applied in the E-MBS MAP and transmits the E-MBS MAP to the terminal.

In such case, the information on the time of application is in unit of superframes or MSI.

Referring to FIG. 4, in case of receiving the third E-MBS MAP where the SCD update indicator is set as '1', the idle mode terminal remains awakened to receive the first SCD message after the E-MBS MAP or in case the time of transmission of the first SCD message after the E-MBS MAP may be known, receives the SCD message from the base station at the SCD message transmission time and then updates the existing E-MBS related parameter by using the changed E-MBS related parameter.

2. Transmit SCD update indicator and SCD transmission offset included in E-MBS MAP: When the SCD update indicator is set as '1' (i.e., in case of indicating that the E-MBS related parameter included in the SCD message is changed), the base station includes information on the time that the SCD message including the changed E-MBS related parameter is transmitted (for example, SCD transmission offset) in the B-MRS MAP and transmits it to the terminal.

The following Table 5 shows an example of the E-MBS MAP format including SCD transmission offset information according to an embodiment of this disclosure.

TABLE 5

| Syntax | Size in bits | Description/Notes |
| --- | --- | --- |
| E-MBS-MAP ( ) { | — | — |
| ... | ... | ... |
| SCD change indicator | 1 | Indicates whether the SCD message including the changed E-MBS parameters will be transmitted in this MSI. If this field is set to 1, the super frame offset at which the SCD message including the changed E-MBS parameters is transmitted will be included in this E-MBS MAP. |
| If (SCD update indicator ==1) { | | |
| SCD transmission time offset | Variable | Indicates the superframe offset at which the changed AAI_SCD message is transmitted. The size of this field depends on MSI MSI == 0b00: 1 bits MSI == 0b01: 2 bits |

TABLE 5-continued

| Syntax | Size in bits | Description/Notes |
| --- | --- | --- |
| | | MSI == 0b10: 3 bits MSI == 0b11: 4 bits |
| } | | |
| ... | ... | ... |
| E-MBS DATA IE( ) | — | — |
| } | | |
| Padding | variable | Padding to reach byte boundary |

Figure 5:
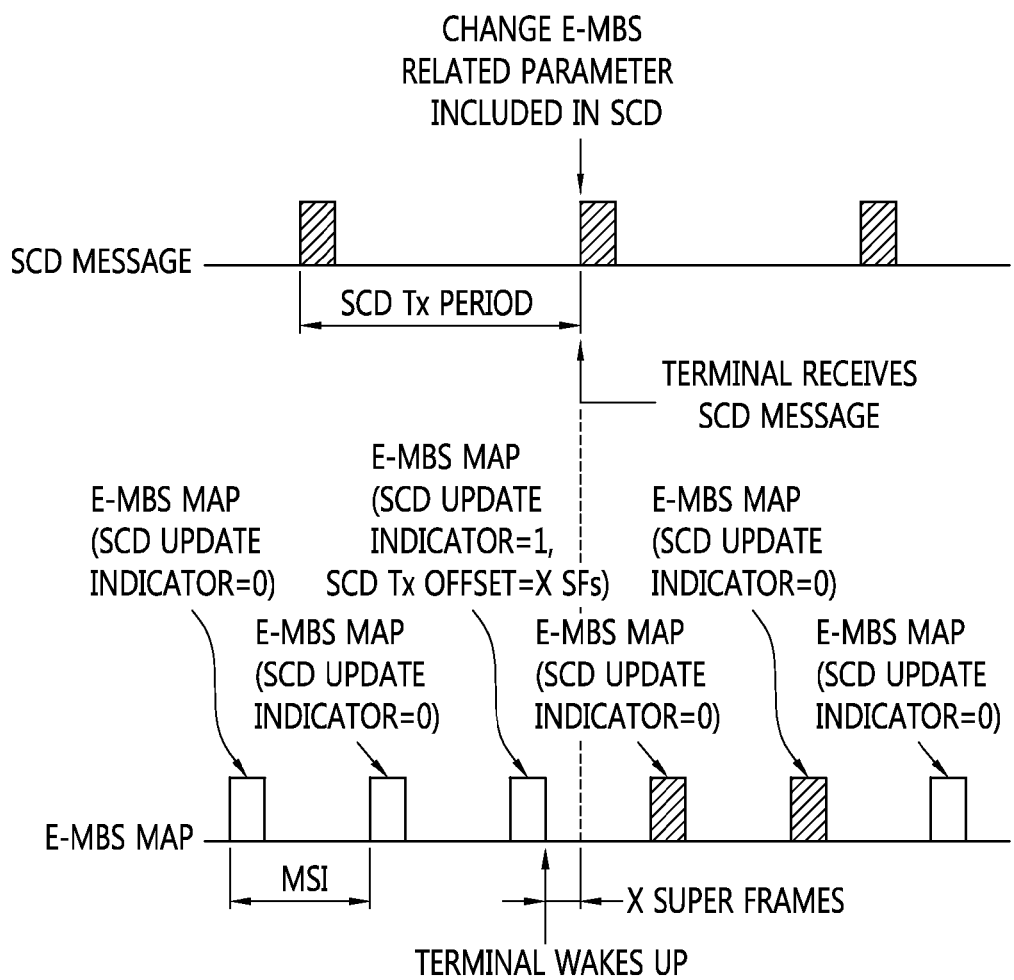
FIG. 5 is a view illustrating a method of updating an E-MBS related parameter by transmitting an E-MBS MAP including an SCD update indicator and an SCD transmission offset.

Referring to FIG. 5, if the SCD update indicator is set as, e.g., '1', the SCD message including the changed E-MBS parameter is transmitted within the next MSI (E-MBS scheduling interval), and time that the SCD message including the changed E-MBS parameter (that is, transmission superframe offset) is included in the E-MBS MAP.

The size of the SCD transmission time offset field is determined by the MSI value.

According to the E-MBS configuration message (AAI_E-MBS-CFG), MSI is set as 2 superframes when it is e.g., '0b00', 4 superframes when it is '0b01', 8 superframes when it is '0b10', and 16 superframes when it is '0b11'.

Accordingly, the size of the SCD transmission time offset field may be set as 1bit when MSI '0b00', 2 bits when '0b01', 3 bits when '0b10', and 4 bits when '0b11'.

As an example, if MSI is determined as 4 superframes, 8 superframes, 16 superframes, 32 superframes, according to the MSIs, the size of SCD transmission time offset is to be set as 2, 3, 4, and 5, respectively.

FIG. 5 is a view illustrating a method of updating an E-MBS related parameter by transmitting an E-MBS MAP including an SCD update indicator and an SCD transmission offset.

Referring to FIG. 5, if the E-MBS related parameter in the SCD message is changed, the base station sets the SCD update indicator as '1' and transmits the E-MBS MAP to the terminal with the SCD transmission time offset included in the E-MBS MAP. Receiving the E-MBS MAP including the SCD transmission time offset information and the SCD update indicator indicating that the E-MBS related parameter is changed, the terminal wakes up at the transmission time indicated by the SCD transmission time offset and receives the SCD message so as to update the system information of the changed SCD message.

Figure 6:
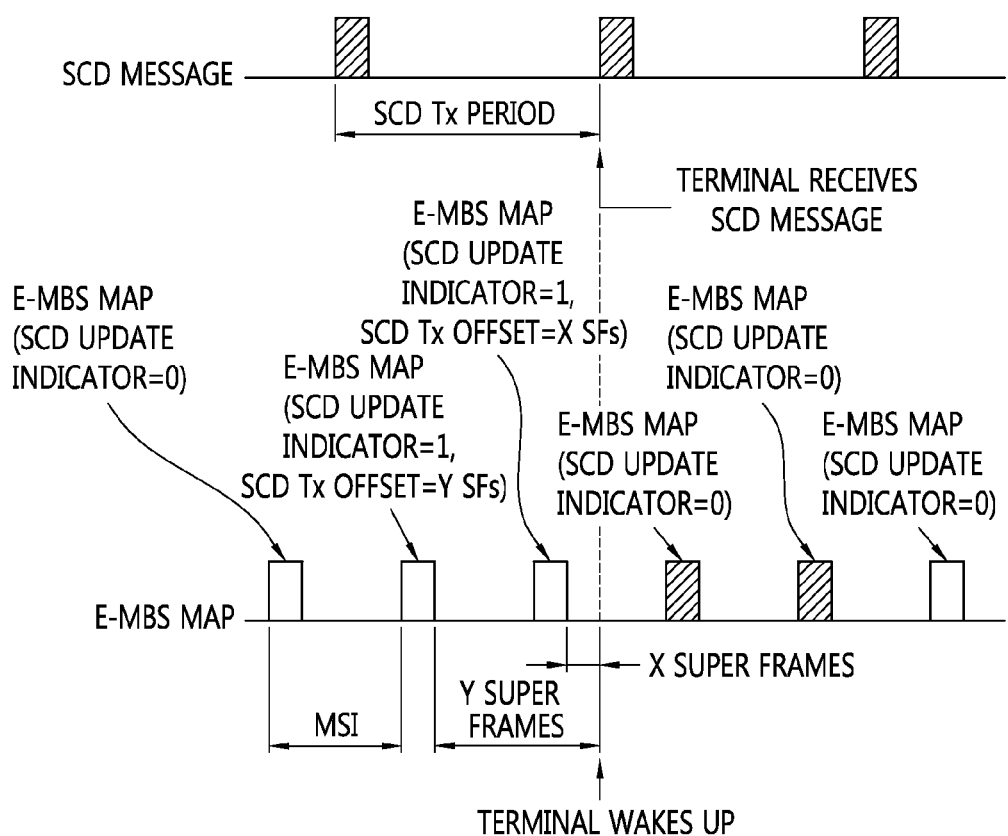
FIG. 6 is a view illustrating a method of updating an E-MBS related parameter by transmitting all the E-MBS MAPs transmitted to a terminal during a period of the SCD message to the terminal, with the SCD update indicator and SCD transmission offset in the E-MBS MAPs according to another embodiment of this disclosure.

FIG. 6 is a view illustrating a method of updating an E-MBS related parameter by transmitting all the E-MBS MAPs transmitted to a terminal during a period of the SCD message to the terminal, with the SCD update indicator and SCD transmission offset in the E-MBS MAPs according to another embodiment of this disclosure.

Referring to FIG. 6, in case of including the changed E-MBS parameter in the next SCD message to be transmitted to the terminal and transmitting the SCD message, the base station may set the SCD update indicators of all the E-MBS MAPs transmitted to the terminal during the period of the SCD message as '1', and may include information indicating the position where the next SCD message is transmitted in all the E-MBS MAPs whose SCD update indicator is set as '1' and may transmit it to the terminal.

The following Table 6 shows an example of the E-MBS MAP format including the SCD transmission offset information according to another embodiment of this disclosure.

TABLE 6

| Syntax | Size in bits | Description/Notes |
|---|---|---|
| E-MBS-MAP ( ) { | — | — |
| ... | ... | ... |
| SCD change indicator | 1 | Indicates whether the next SCD message includes the changed E-MBS parameters<br>If this field is set to 1, the super frame offset at which the SCD message |

TABLE 6-continued

| Syntax | Size in bits | Description/Notes |
|---|---|---|
| | | including the changed E-MBS parameters is transmitted will be included in this E-MBS MAP. |
| If (SCD update indicator ==1) {<br>SCD transmission time offset | Variable | Indicates the superframe offset at which the changed AAI_SCD message is transmitted. |
| } | | |
| ... | ... | ... |
| E-MBS DATA IE( ) | — | — |
| } | | |
| Padding | variable | Padding to reach byte boundary |

The following Table 7 shows another example of the E-MBS MAP format including the SCD indicator and SCD transmission time offset information.

TABLE 7

| Syntax | Size in bits | Description/Notes |
|---|---|---|
| E-MBS-MAP ( ) { | — | — |
| ... | ... | ... |
| ESI update indicator | 1 | E-MBS system information update indicator<br>Indicates whether the system information related to E-MBS Zone is changed<br>If this field is set to 1, it indicates that one or more E-MBS related system parameters included in S-SFH SP 2 or SCD message are changed |
| If (ESI update indicator ==1) {<br>Change bitmap | 2 | Bit #0: if this bit is set to 1, it indicates that the E-MBS related system information (e.g., DSAC, DFPC, DFPSC) included in S-SFH SP2 is changed<br>Bit #1: if this bit is set to 1, it indicates that the E-MBS related system information (e.g., Zone allocation Bit-MAP, ZF, MSI Length, E-MBS AAI frame offset) included in SCD message is changed |
| If (change bitmap =0b01) {<br>S-SFH SP2 transmission time offset | Variable | Indicates the superframe offset at which the changed S-SFH SP2 is transmitted. |
| } else if (change bitmap = 0b10) {<br>SCI) transmission time offset | Variable | Indicates the superframe offset at which the changed SCD is transmitted. |
| } else if (change bitmap = 0b11) {<br>Same frame indicator | 1 | 0b1: Indicates that the SCD message is transmitted at the same superframe as the changed S-SFH SP2 |
| If (Same frame indicator == 1) {<br>Transmission time offset | | Indicates the superframe offset at which the changed SCD and changed S-SFH SP2 are transmitted. |
| } else {<br>S-SFH SP2 transmission time offset | Variable | Indicates the superframe offset at which the changed S-SFH SP2 is transmitted. |
| SCD transmission Lime offset | Variable | Indicates the superframe offset at which the changed SCD is transmitted. |
| }<br>}<br>... | ... | ... |
| E-MBS DATA IE( )<br>} | — | — |
| Padding | variable | Padding to reach byte boundary |

Second Embodiment

The second embodiment provides a method of transmitting E-MBS zone information on the neighboring E-MBS zone to the terminal through the E-MBS configuration message (AAI_E-MBS-CFG message).

Some of E-MBS related parameters are transmitted through the SCD message, and

E-MBS ID and FID mapping list information on the current E-MBS zone and the neighboring E-MBS zone are transmitted through the E-MBS configuration message (AAI_E-MBS-CFG message).

However, E-MBS region information to be used for the neighboring E-MBS zone (Zone Allocation Bit-MAP, ZF, MSI length, E-MBS AAI frame offset) is not transmitted to the terminal when the information on the neighboring E-MBS zone is transmitted.

However, in case information on the current E-MBS zone is different from information on the neighboring E-MBS zone, the terminal cannot receive the E-MBS until the terminal moves to the neighboring E-MBS zone to receive the SCD.

Accordingly, the second embodiment of this disclosure provides a method of transmitting E-MBS region information on the neighboring E-MBS zone (i.e., Zone Allocation Bit-MAP, ZF, MSI length, E-MBS AAI frame offset for the neighboring zone) through the E-MBS configuration message AAI_E-MBS-CFG message) to the terminal.

That is, the base station transmits the E-MBS ID and FID mapping list information on the neighboring E-MBS zone in the AAI_E-MBS-CFG message to the terminal, together with the E-MBS region information for the neighboring E-MBS zone.

The following Table 8 shows an example of the AAI_E-MBS-CFG message format including the E-MBS region information on the neighboring E-MBS zone.

TABLE 8

| Syntax | Size in bits | Value/Notes |
| --- | --- | --- |
| AAI_E-MBS-CFG message ( ) { | | |
| ... | | |
| E-MBS ID and FID Mappings List inclusion | | Indicates whether E-MBS ID and FID Mapping list is included or not<br>0b0: No Zone boundary or Zone boundary but no inter-zone service continuity in neighbor ABS<br>0b1: Zone boundary and inter-zone service continuity |
| if (E-MBS ID and FID Mappings List inclusion ==1) { | 1 | |
| E-MBS ID and FID Mappings List | Variable | E-MBS ID and FID Mappings List between serving and neighbor E-MBS Zones |
| } | | |
| ... | | |
| Zone_Allocation-Bit-MAP | $DSAC_{MAX} - 1$ | |
| ZF | 1 | |
| MSI Length | 2 | |
| ... | | |

In Table 8, E-MBS ID and FID Mappings List indicates . . . between Serving E-MBS Zone and neighboring E-MBS Zone, and the following information is included:

```
Num_Neighbor_E-MBS_Zones (3 bits)
AAI_NBR-ADV Change Count (3 bits)
for (i = 0; i< Num_Neighbor_E-MBS_Zones; i++) {
Neighbor_E-MBS_Zone_ID (7 bits)
Physical Carrier Index (6 bits)
Number_Neighbor_ABS (8 bits)
for (j = 0; j< Number_Neighbor_ABS; j++) {
Index of BS (8 bits)
}
Num_E-MBS ID_FID Mappings (4 bits)
for (k = 0; k< Num_E-MBS ID_FID Mappings; k++) {
Current_E-MBS ID and FID (k),
New_E-MBS ID and FID (k),
}
}
```

The E-MBS related information included in SCD (Zone Allocation-Bit-MAP, ZF, MSI length) may be included per E-MBS zone in these types of information as follows:

```
Num_Neighbor_E-MBS_Zones (3 bits)
AAI_NBR-ADV Change Count (3 bits)
for (i = 0; i< Num_Neighbor_E-MBS_Zones; i++) {
Neighbor_E-MBS_Zone_ID (7 bits)
Physical Carrier Index (6 bits)
Number_Neighbor_ABS (8 bits)
Neighbor E-MBS Zone region inclusion (1 bit)
If (Neighbor E-MBS Zone region inclusion == 1) {
Zone_Allocation-Bit-MAP (DSACMAX-1 bits)
ZF (1 bit)
MSI Length (2 bits)
}
for (j = 0; j< Number_Neighbor_ABS; j++) {
Index of BS (8 bits)
}
Num_E-MBS ID_FID Mappings (4 bits)
for (k = 0; k< Num_E-MBS ID_FID Mappings; k++) {
Current_E-MBS ID and FID (k),
New_E-MBS ID and FID (k),
}
}
```

That is, as shown in Table 8, the E-MBS terminals receive the E-MBS region information on the neighboring E-MBS zone and when moving over to the neighboring E-MBS zone may continuously receive the E-MBS by using the corresponding information.

The following Table 9 shows an example of the AAI_E-MBS-CFG message format including, per base station, the E-MBS resource region information for the base stations belonging to the neighboring zone.

TABLE 9

| Syntax | Size (bits) | Value/Notes | Condition |
|---|---|---|---|
| AAI_E-MBS-CFG message ( ) { | | | |
| E-MBS_CFG_LIFETIME (m) | 4 | | |
| | | ... | ... |
| AAI-NBR-ADV Change Count | | | |
| For (j=0; | | Num_Neighor_E-MBS_Zones is | Present when the SABS is |
| j<Num_Neighbor_EMBS_ | | the | located at the zone boundary |
| Zones; j++) { | | number of neighbor E-MBS | and inter-zone service |
| | | Zone of | continuity |
| | | an E-MBS Zone. | is supported. |
| | | Range: 0~7 | |
| Neighbor E-MBS Zone ID | 7 | Neighbor E-MBS Zone ID | Neighbor E-MBS Zone ID |
| Physical Carrier Index | 6 | | |
| For (k=0; | | | |
| k<Num_Neighbor_ABS; k++) { | | | |
| ABS Index | 8 | | |
| Neighbor ABS's E-MBS Zone | 1 | Indicates whether E-MBS zone | |
| region inclusion | | region information for the | |
| | | neighboring base station is | |
| | | included. Once ABS index | |
| | | came out of another | |
| | | neighboring E-MBS zone, this | |
| | | bit is set as 0, and no related | |
| | | information is included. That | |
| | | is, only when ABS index didn't | |
| | | come out before at once, this is | |
| | | set as 1. | |
| If (Neighbor ABS's E-MBS | | | |
| Zone region inclusion == 1) { | | | |
| Zone_Allocation-Bit-MAP | DSACMA X-1 bits | | included in case ABS index didn't come out before at once. |
| ZF | 1 | | included in case ABS index didn't come out before at once. |
| MSI Length | 2 | | included in case ABS index didn't come out before at once. |
| } | | | |
| } | | | |
| ... | | ... ... | ... |

The E-MBS resource region information (Zone Allocation Bit Map, ZF, MSI Length, etc.) for the base stations in the neighboring zone is included per base station in the neighboring zone. At this time, if the same base station index (ABS index) came out before (that is, if ABS index came out before as the base station that belongs to another neighboring zone for each serving E-MBS zone), information on the corresponding base station is not included, and the terminal applies same way the information that came out before.

That is, only when the corresponding ABS index came out first time in this message, the E-MBS resource region information (Zone Allocation Bit Map, ZF, MSI Length, etc.) is included.

The following Table 10 shows an example of the AM E-MBS-CFG message format including the E-MBS resource region information for base stations belonging to the neighboring zone.

TABLE 10

| Syntax | Size (bits) | Value/Notes | Condition |
|---|---|---|---|
| AAI_E-MBS-CFG message ( ) { | | | |
| E-MBS_CFG_LIFETIME (m) | 4 | | |
| | | ... | ... |
| AAI-NBR-ADV Change Count | | | |
| For (j=0; | | Num_Neighor_E-MBS_Zones is | Present when the SABS is |
| j<Num_Neighbor_EMBS_ | | the | located at the zone boundary |
| Zones; j++) { | | number of neighbor E-MBS | and inter-zone service |
| | | Zone of | continuity is supported. |
| | | an E-MBS Zone. | |
| | | Range: 0~7 | |
| Neighbor E-MBS Zone ID | 7 | Neighbor E-MBS Zone ID | Neighbor E-MBS Zone ID |
| Physical Carrier Index | 6 | | |
| For (k=0; | | | |
| k<Num_Neighbor_ABS; k++) { | | | |

TABLE 10-continued

| Syntax | Size (bits) | Value/Notes | Condition |
|---|---|---|---|
| ABS Index | 8 | | |
| } | | | |
| For (m=0; m<N_EMBS_ FID_Mapping; m++) { | | | |
| Current_E-MBS ID and FID and New_E-MBS_ID and FID | 32 | | |
| } | | | |
| } | | | |
| } | | | |
| For (k=0; k<Num_Neighbor_ABS; k++) { | | E-MBS resource region information for the ABSs belonging to the neighboring E-MBS zone above included | Present when the SABS is located at the zone boundary and inter-zone service continuity is supported. |
| ABS Index | 8 | | |
| Zone_Allocation-Bit-MAP | DSACMA X-1 bits | | |
| ZF | 1 | | |
| MSI Length | 2 | | |

Third Embodiment

The third embodiment provides a method of updating the E-MBS ID and FID mapping list for the neighboring E-MBS zone by informing the terminal that the base station is positioned at the E-MBS zone boundary.

The terminal receives the E-MBS configuration message (AAI_E-MBS-CFG) from the base station. That is, the terminal receives EMBS related system information through the received E-MBS-CFG.

The terminal receives the E-MBS MAP and E-MBS bursts from the base station based on the received E-MBS related system information.

Here, the E-MBS-CFG message is periodically transmitted from the base station, and to determine whether the terminals receiving the E-MBS at each transmission period are to receive the E-MBS-CFG message, the base station allows the terminal to receive the message only when the terminal needs to decode the E-MBS-CFG message by using E-MBS-CFG-LIFETIME(m) included in the E-MBS-CFG message.

That is, the terminal decodes the AAI_E-MBS-CFG message only in the superframe having Nsuperframe superframe number that satisfies Nsuperframe modulo 32(m+1)=32 (m+1)−1.

The E-MBS ID and FID mapping list included in the E-MBS CFG message is included only in the base station positioned at the E-MBS zone boundary, and thus, even in the same zone, the base station positioned at the zone boundary has different E-MBS ID and FID mapping list information from the base station positioned inside the zone.

Accordingly, when shifting from the base station positioned inside the E-MBS zone to the E-MBS zone boundary in the same E-MBS zone, the terminals should receive the E-MBS-CFG message and should update the E-MBS ID and FID mapping list.

However, when coming to the zone boundary, the terminals may not update the E-MBS ID and FID mapping list information until the next AAI is received which is indicated by E-MBS-CFG-LIFETIME.

That is, in the third embodiment, the base station positioned at the E-MBS zone boundary informs the terminals that the corresponding base station is positioned at the zone boundary. Accordingly, when coming to the base station positioned at the zone boundary, the E-MBS terminal updates the E-MBS-CFG message in case the terminal does not receive the AAI_E-MBS-CFG message from the base station at once.

Figure 7:
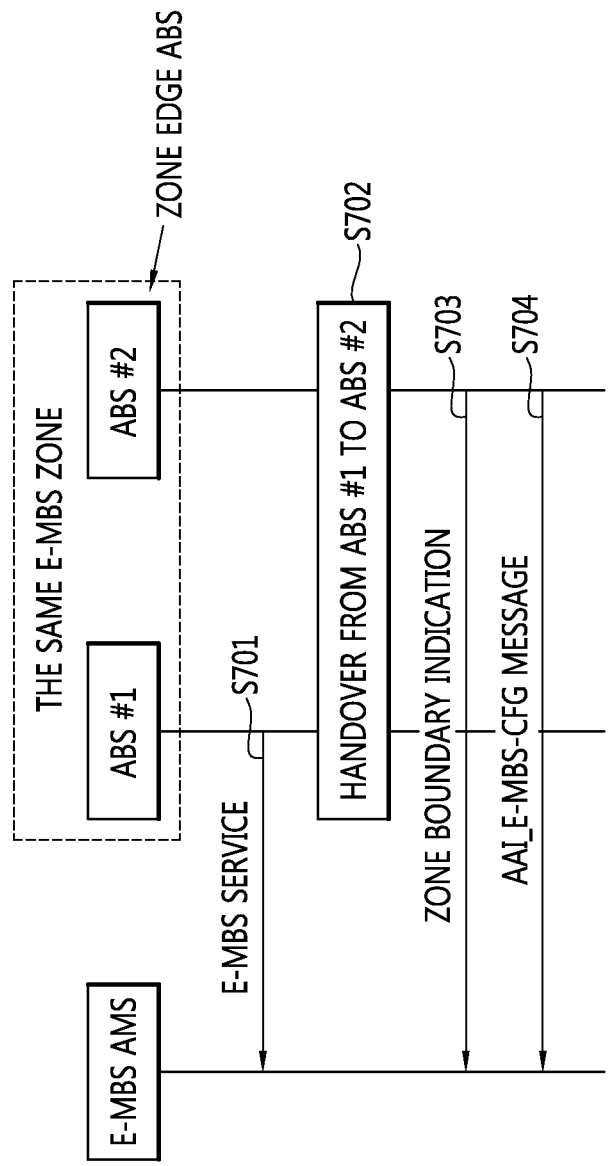
FIG. 7 is a flowchart illustrating a method of transmitting an E-MBS zone boundary indication to an E-MBS terminal according to a third embodiment of this disclosure.

FIG. 7 is a flowchart illustrating a method of transmitting an E-MBS zone boundary indication to an E-MBS terminal according to a third embodiment of this disclosure.

Referring to FIG. 7, the terminal receives E-MBS from a base station ABS 1 supporting the E-MBS (S701).

In case the terminal shifts to another base station ABS2 belonging to the same E-MBS zone as the ABS 1 while the E-MBS is received from ABS 1 (S702), the terminal receives from ABS 2 a first message including information (E-MBS zone boundary indication) indicating that ABS 2 is positioned at the E-MBS zone boundary (S703).

Here, the first message may be one of E-MBS MAP, SFH, and SCD message.

Next, in case of receiving the first message from ABS 2, the terminal identifies whether ABS 2 is positioned at the E-MBS zone boundary.

If it is identified that ABS 2 is positioned at the E-MBS zone boundary, the terminal reads the E-MBS-CFG message irrespective of the value of E-MBS-CFG-LIFETIME.

Accordingly, the terminal, which moves to the base station positioned at the E-MBS zone boundary and successfully receives the AAI_E-MBS-CFG message, receives the next AAI_E-MBS-CFG message from the base station based on the E-MBS-CFG-LIFETIME value included in the E-MBS-CFG message (S704).

The following Table 11 shows an example of E-MBS MAP format including the E-MBS zone boundary indication according to the third embodiment of this disclosure.

TABLE 11

| Syntax | Size in bits | Description/Notes |
|---|---|---|
| E-MBS-MAP ( ) { | — | — |
| ... | ... | ... |
| E-MBS Zone boundary Indication | 1 | Indicates whether this ABS is the ABS in the E-MBS Zone boundary 1: The ABS is the E-MBS Zone boundary ABS |
| ... | ... | ... |
| Padding | variable | Padding to reach byte boundary |

That is, as shown in Table 11, when the E-MBS terminal moves over to the new base station to receive the E-MBS MAP, if the E-MBS zone boundary indication included in the E-MBS MAP is set as, e.g., '1', the process of reading the AAI_E-MBS-CFG message transmitted from the new base station is performed.

Further, information on whether the base station informs the terminals whether it is positioned at the E-MBS zone boundary may be also transmitted to the terminals through SFH or AAI_SCD message as well as E-MBS MAP.

That is, when shifting over to the base station in the same E-MBS zone, the terminal receives the SFH or AAI_SCD message and then identifies whether the base station to which the terminal has been newly shifted is positioned at the E-MBS zone boundary. If it is identified that the corresponding base station is positioned at the zone boundary, the terminal receiving the E-MBS reads the AAI_E-MBS-CFG message transmitted from the new base station.

The following Table 12 shows an example of SFH format including the E-MBS zone boundary indication according to the third embodiment of this disclosure. Here, SFH may be one of P-SFH, S-SFH 1, S-SFH 2, and S-SFH 3.

TABLE 12

| Syntax | Size in bits | Description/Notes |
| --- | --- | --- |
| SFH ( ) { | — | — |
| ... | ... | ... |
| E-MBS Zone boundary Indication | 1 | Indicates whether this ABS is the ABS in the E-MBS Zone boundary<br>1: The ABS is the E-MBS Zone boundary ABS |
| ... | ... | ... |
| Padding | variable | Padding to reach byte boundary |

The following Table 13 shows an example of AAI_SCD message format including the E-MBS zone boundary indication according to the third embodiment of this disclosure.

TABLE 13

| Syntax | Size in bits | Description/Notes |
| --- | --- | --- |
| AAI SCD message ( ) { | — | — |
| ... | ... | ... |
| E-MBS Zone boundary Indication | 1 | Indicates whether this ABS is the ABS in the E-MBS Zone boundary<br>1: The ABS is the E-MBS Zone boundary ABS |
| ... | ... | ... |
| Padding | variable | Padding to reach byte boundary |

Figure 8:
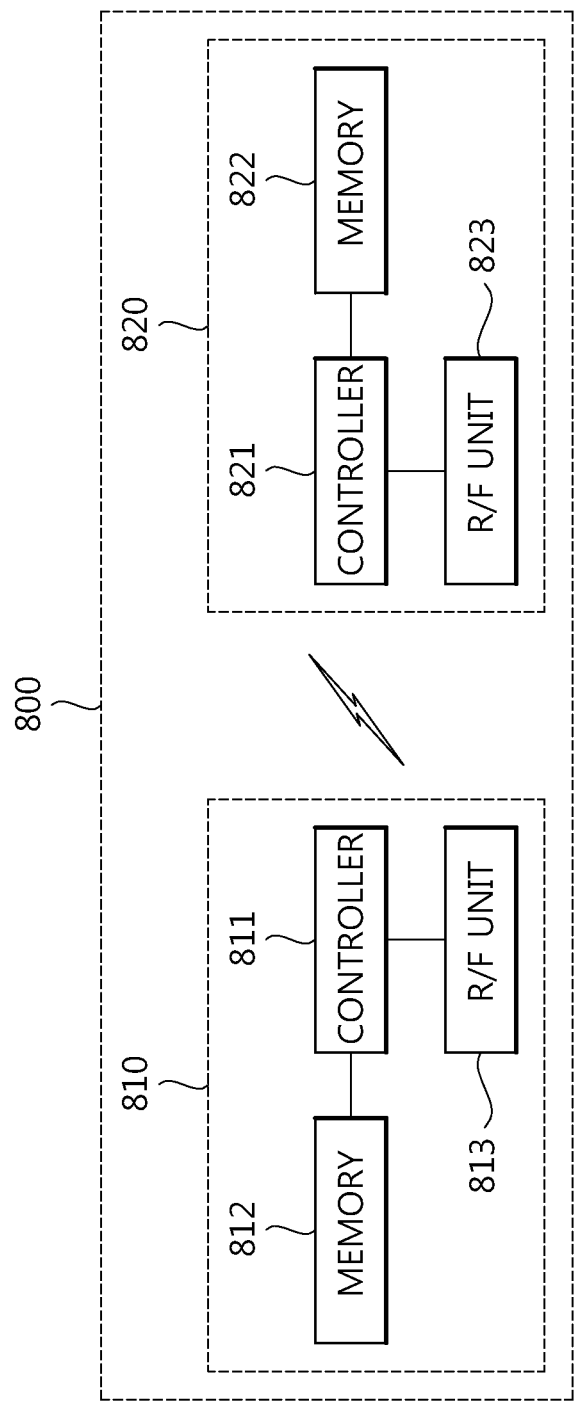
FIG. 8 is a block diagram illustrating a wireless communication system according to an embodiment of this disclosure.

FIG. 8 is a block diagram illustrating a wireless communication system according to an embodiment of this disclosure.

A base station 810 includes a controller 811, a memory 812, and a radio frequency (RF) unit 813.

The controller 811 implements the suggested functions, procedures, and/or methods. The radio interface protocol layers may be implemented by the controller 811.

In case the E-MBS related parameter is changed, the controller 811 enables at least one of an SCD update indicator or an SCD transmission offset to be included in an E-MBS MAP and the E-MBS MAP to be transmitted to the terminal.

The memory 812 is connected to the controller 811 and stores protocols or parameters for updating the E-MBS related parameter. The RF unit 813 is connected to the controller 811 and transmits and/or receives radio signals.

A terminal 820 includes a controller 821, a memory 822, and an RF unit 823.

The controller 821 implements the suggested functions, procedures, and/or methods. Radio interface protocol layers may be implemented by the controller 821.

The controller 821 enables an idle mode to be shifted to a connection mode in case the E-MBS MAP includes an SCD update indicator indicating whether the E-MBS related parameter included in the SCD message is changed.

The memory 822 is connected to the controller 821 and stores protocols or parameters for updating the E-MBS related parameter. The RF unit 823 is connected to the controller 821 and transmits and/or receives radio signals.

The controllers 811 and 821 may include application-specific integrated circuits (ASICs), other chipsets, logic circuits and/or data processing devices. The memories 812 and 822 may include read-only memories (ROMs), random access memories (RAMs), flash memories, memory cards, storage media, and/or other storage devices. The RF units 813 and 823 may include baseband circuits for processing radio signals. When implemented in software, the above-described methods may be implemented in modules (procedures, functions, etc.) to perform the above-described functions. The modules may be stored in the memories 812 and 822 and may be executed by the controllers 811 and 821. The memories 812 and 822 may be positioned inside or outside the controllers 811 and 821, respectively, and may be connected to the controllers 811 and 821, respectively, via various well-known means.

What is claimed is:

1. A method of updating enhanced multicast and broadcast service (E-MBS) related system information in an idle mode, the method comprising:
  receiving a first system configuration descriptor (SCD) message including an E-MBS related parameter from a base station;
  receiving a first message including an indicator indicating whether the E-MBS related parameter is changed from the base station; and
  performing a wake-up operation in the idle mode when the indicator indicates that the E-MBS related parameter is changed,
  wherein the indicator indicates whether an E-MBS related parameter included in an SCD message first transmitted after the first message is transmitted is changed,
  wherein the indicator is an SCD update indicator represented by a bitmap,
  wherein the first message further includes an SCD transmission time offset field indicating a time that a second SCD message including the changed E-MBS related parameter is transmitted, and
  wherein a size of the SCD transmission time offset field is determined according to a value of an E-MBS scheduling interval (EMI).

2. The method of claim 1, further comprising:
  receiving the second SCD message including the changed E-MBS related parameter from the base station; and
  updating the E-MBS related parameter based on the received second SCD message.

3. The method of claim 1, wherein the E-MBS related parameter indicates at least one of information corresponding to allocation of an E-MBS zone to which the base station belongs, information indicating the length of an E-MBS scheduling interval, and information indicating a position of a frame where an E-MBS data burst ends.

4. The method of claim 1, wherein the first message is an E-MBS MAP.

5. A terminal for updating enhanced multicast and broadcast service (E-MBS) related system information in an idle mode, the terminal comprising:
  a radio frequency unit for transmitting and receiving a radio signal to/from an outside; and
  a controller connected to the radio frequency unit,
  wherein the controller controls the radio frequency unit configured to receive a first system configuration descriptor (SCD) message including an E-MBS related parameter from a base station, controls the radio frequency unit configured to receive a first message including an indicator indicating whether the E-MBS related parameter is changed from the base station, and when the indicator indicates that the E-MBS related parameter is changed, controls the idle mode to be shifted to a connection mode, wherein the indicator indicates whether an E-MBS related parameter included in an SCD message first transmitted after the first message is transmitted is changed, wherein the indicator is an SCD update indicator represented by a bitmap, wherein the first message further includes an SCD transmission time offset field indicating a time that a second SCD message including the changed E-MBS related parameter is transmitted, and wherein a size of the SCD transmission time offset field is determined according to a value of an E-MBS scheduling interval (EMI).

6. The terminal of claim 5, wherein the Controller controls the radio frequency unit configured to receive the second SCD message including the changed E-MBS related parameter from the base station; and controls the E-MBS related parameter to be updated based on the received second SCD message.

7. The terminal of claim 5, wherein the E-MBS related parameter indicates at least one of information corresponding to allocation of an E-MBS zone to which the base station belongs, information indicating the length of an E-MBS scheduling interval, and information indicating a position of a frame where an E-MBS data burst ends.

8. The terminal of claim 5, wherein the first message is an E-MBS MAP.

* * * * *